Patented Apr. 30, 1935

1,999,717

UNITED STATES PATENT OFFICE 1,999,717

PLASTICIZED SYNTHETIC RESIN

Horace P. Billings, Merchantville, and Dee A. Hurst, Haddonfield, N. J., assignors to Radio Corporation of America, a corporation of Delaware No Drawing. Application June 30, 1932, Serial No. 620,284

2 Claims. (Cl. 134—26)

This invention relates to synthetic resins of the type employed, for example, in the manufacture of flexible phonograph records in which sound vibrations are embossed or moulded by a combination of heat and pressure and, more particularly, to the method of plasticizing resins of this type.

Laminated phonograph records of the thin, flexible type have recently come into fairly extensive use. Records of this type comprise a suitable base, generally of cardboard or paper, covered by one or more layers of a material which, under the action of heat and pressure followed, in some cases, by cooling, becomes hard and is thus rendered fit for the retention of sound grooves impressed therein.

One class of materials employed for surface coatings for phonograph records comprises synthetic resins prepared from the chemical reaction of condensation between a phenolic substance and an aldehyde. The phenolic substance may be phenol, resorcinol, cresols or xylenols, while the aldehyde is usually formaldehyde, acetaldehyde, or furfural, and the resins may be made of a single phenolic substance with a single aldehyde or any combinations thereof.

Synthetic resins found suitable for use in making phonograph records are of two types, namely, the thermoplastic resins, and the "curing" or thermosetting resins. The first type may be applied, either directly or in solution, to a suitable base material, and, after being subjected to pressure by a heated matrix, require cooling before they harden sufficiently to permit removal from the press. With the second type, however, which may be applied to the base material in the form of a varnish, cooling is not necessary prior to removal from the press, because this type of resin is polymerized or chemically changed by heat and pressure to a hard insoluble, infusible mass, so that the pressed record may be removed from the press while hot.

Among the requirements for laminated records formed of resins of either type are (1) that the finished records shall be flexible, (2) that the finished records shall have minimum surface noise, and (3) that the finished records shall be tough and durable. The first is necessary for safe handling, shipping and storage; the second is necessary as an element of satisfactory reproduction; while the third is essential to long life despite frequent playing of the record.

It has been proposed to use a resin formed from resorcinol and formaldehyde in the manufacture of phonograph records, this resin having been found to be satisfactory from other considerations. However, resins wherein resorcinol forms the phenolic substance have been found to be hard and brittle in the absence of suitable plasticizers, and are characterized by relatively high surface noise, making them unfit for use in phonograph records if the aforementioned requirements are to be met. To overcome this, it has been proposed to incorporate glycerine into the resin, but this is not of much value because the glycerine does not entirely remove the brittleness from the resin and, furthermore, because the finished record usually has a plurality of hollows in its surface.

In accordance with our invention, we introduce into the resin plasticizers in the form of vegetable and animal oils and waxes in order to toughen the resin and, at the same time, render it flexible. We have found, moreover, that these plasticizers also form good vehicles for the various fillers employed in processing the records and that they greatly reduce the surface noise of the finished record. The oils and waxes may be in either the raw state, or in treated form.

Examples of the oils and waxes which we have found satisfactory are oleic acid (red oil), raw linseed oil, spermaceti wax, Japan wax, beeswax, candelilla wax, Montan wax, carnauba wax, raw fish oil, menhaden oil, sperm and sardine oils, raw corn oil, raw cotton seed oil, raw poppy seed oil, raw rape seed oil, raw castor oil, raw soya bean oil, raw sesame oil and raw perilla oil. In most instances, we have found blown varieties of some of these oils, with or without driers, like salts of lead, cobalt and manganese to possess greater advantages than the raw oils, and the blown oils may be used alone or in combination with the raw oils. Sulphur treated oils, such as are obtained from heating sulphur with drying and semi-drying oils, like linseed oil and fish oils, have also been found useful. Particularly good results may be obtained by using a combination of blown drying oils with raw oil, while the addition of small amounts of fatty acids of these oils to the combination helps to increase flow of the resin, assists in keeping the oil in the resin, and prevents the oils from exuding, or coming to the surface, during the curing process. This results in good definition in addition to overcoming defects of the prior art. We are thus able to obtain the primary object of our invention, namely, to provide a synthetic resin for phonograph records and like materials which will not be subject to the disadvantages present in resins of this type heretofore known.

Another object of our invention is to provide an improved synthetic resin which is particularly fit for use in the manufacture of phonograph records.

Still another object of our invention is to provide an improved synthetic resin for phonograph records which will result in records having sufficient flexibility and toughness to stand up under rough handling and continued use.

A further object of our invention is to provide an improved synthetic resin for phonograph records which will result in records having minimum surface noise during reproduction.

Still a further object of our invention is to provide an improved synthetic resin for phonograph records which will result in records having fine definition.

It is another object of our invention to provide an improved synthetic resin for laminated articles, such as phonograph records, which is economical in use, and which lends itself to rapid quantity production of the laminated articles.

The above and ancillary objects and advantages of our invention will become more apparent from the following description of several methods of forming a resin according to our invention:

In producing a thermoplastic resin according to our invention, we treat the resins with the oils by either of two methods. We either mix, in the softened resin, 2 to 20% of plasticizer (based on the resin) in a compounding mill, or we effect solution of the resin and the oils in solvents which dissolve the resin and the oils mutually. Solvents in which compatability of the two operates are toluene, benzol, esters, acetone, and petroleum distillates, such as gasoline or naphtha.

By the first method of incorporation, the resin is reduced to a plastic form which can be applied to a base material of cardboard, metal pressboard, parchment, fibre board, or similar material by means of a coating machine consisting of several steel rollers between which the base material is sheeted through, with the softened plastic material applied as a coating. The record blanks may, subsequently, be pressed by means of a metal matrix set in a moulding press which is provided with a heating medium, such as steam, means for applying pressure, and means for cooling. The plastic material may be used to manufacture a solid record, if desired, which consists entirely of the plasticized mass instead of a laminated record, as above described. Resins of the thermoplastic type which are satisfactorily plasticized according to our method may consist of urea or urea derivatives which have been caused to react with formaldehyde or similar aldehydes, acetaldehyde, or furfurol.

The second method of incorporating the oils and waxes enumerated above relates to the thermoplastic resins of the phenolic-formaldehyde type. The oils may be incorporated with the raw materials and a catalyst, either acidic or basic in nature, may also be added before heating of the resin. The resins so formed do not become infusible and insoluble by the action of heat, and they are, therefore, susceptible to moulding, it being necessary to cool them before they harden in the desired form. Subsequently, they may be remoulded.

Coming, now, to the "curing" resins, they may be plasticized, in accordance with our invention, by incorporating any of the aforementioned oils in the early stage of the resin formation. The resins may be of liquid form, or as ingredients in solid form in moulding powers. As an example of this type of resin, we may melt 100 parts, by weight, of resorcinol, ground to pass through a 16 mesh sieve, with 37.5% formaldehyde solution (formalin) at 60° C. These materials are first melted in a jacketed kettle provided with means for steam-heating the mass and with means for cooling. Agitation may be accomplished by means of a vertical propeller type paddle placed in the kettle. 8 parts, by weight, of para-nitraniline may be dissolved in 40 parts, by weight, of alcohol, and added to the contents of the kettle. The temperature is maintained at from 75° C. to 80° C. and 16 parts, by weight, of blown rape seed oil, 5 parts, by weight, of raw rape seed oil, and 8 parts, by weight, of clay or other filler are added in the form of a paste. The mixture then becomes sticky and viscous. At this point, about 40% of water, based on the quantity of alcohol used, is added.

The preparation requires approximately 20 to 30 minutes time. The batch is rapidly cooled and, as a liquid varnish, is applied to a suitable base material, such as parchment, cardboard, fibre, etc. to produce a record blank. After two or three days of drying, the coated paper may be pressed at a temperature of from 160° C. to 180° C., the resin requiring from 5 to 15 seconds to "cure."

Although we have described certain specific embodiments of our invention, we are fully aware that many modifications thereof are possible. For example, instead of employing urea-formaldehyde or resorcinol-formaldehyde resins, we may employ other suitable resins. Similarly, although we have specified certain oils and waxes as being satisfactory, it should be understood that these are merely cited as being exemplary, and that many other oils and waxes may be used with satisfactory results. Our invention, therefore, is not to be restricted except insofar as is necessitated by the prior art and by the spirit of the appended claims.

We claim as our invention:

1. The method of rendering a synthetic curing resin plastic which comprises incorporating a raw fatty oil, a blown drying oil, and the fatty acid of an oil therein in the early stage of resin formation.

2. A synthetic curing resin comprising a condensation product of a phenol and an aldehyde and having a raw fatty oil, a blown drying oil, and the fatty acid of an oil incorporated therein.

HORACE P. BILLINGS.
DEE A. HURST.